(12) United States Patent
Nadel et al.

(10) Patent No.: US 12,465,830 B2
(45) Date of Patent: Nov. 11, 2025

(54) PITCH TRAINING DEVICE WITH INTEGRATED TRACKING AND FEEDBACK SYSTEM FOR ENHANCED PERFORMANCE AND REHABILITATION

(71) Applicants: Robert Geoffrey Nadel, Winchester, MA (US); Richard Nadel, Winchester, MA (US)

(72) Inventors: Robert Geoffrey Nadel, Winchester, MA (US); Richard Nadel, Winchester, MA (US)

( * ) Notice: Subject to any disclaimer, the term of this patent is extended or adjusted under 35 U.S.C. 154(b) by 0 days.

(21) Appl. No.: 18/918,381

(22) Filed: Oct. 17, 2024

(65) Prior Publication Data

US 2025/0262500 A1  Aug. 21, 2025

Related U.S. Application Data

(63) Continuation-in-part of application No. 18/443,697, filed on Feb. 16, 2024, now Pat. No. 12,145,040.

(51) Int. Cl.
*A63B 69/00* (2006.01)

(52) U.S. Cl.
CPC .. *A63B 69/0002* (2013.01); *A63B 2069/0006* (2013.01)

(58) Field of Classification Search
CPC ............... A63B 69/0002; A63B 2069/0006
USPC ................................................. 473/458
See application file for complete search history.

(56) References Cited

U.S. PATENT DOCUMENTS

| | | | |
|---|---|---|---|
| 4,417,730 | A | 11/1983 | Weiner |
| 4,460,172 | A | 7/1984 | Hogan |
| 5,158,517 | A | 10/1992 | Steggert |
| 5,250,016 | A | 10/1993 | Higgins |
| 5,423,730 | A | 6/1995 | Hirsch |
| 5,957,788 | A | 9/1999 | Eze |
| 7,217,202 | B2 | 5/2007 | Troxell |
| 7,374,502 | B2 | 5/2008 | Comello, Jr. |

(Continued)

FOREIGN PATENT DOCUMENTS

| | | |
|---|---|---|
| WO | 0021617 A1 | 4/2000 |
| WO | 2009100393 A2 | 8/2009 |
| WO | 2015073929 A1 | 5/2015 |

*Primary Examiner* — Mitra Aryanpour
(74) *Attorney, Agent, or Firm* — Carson Patents (57) ABSTRACT

The present invention relates to a pitch training attachment for a mechanical exercise training system (METS) that provides real-time tracking, analysis, and feedback to improve a user's pitching performance. The device includes a baseball simulator connected to the METS via an attachment rod and an internal tracking device. The tracking device uses advanced sensors such as accelerometers, gyroscopes, and magnetometers to monitor and report key performance metrics, including speed, direction, pitch trajectory, and spin rate. A wireless communication module transmits the data to an external device, allowing users to receive real-time feedback through a dedicated software application. The system also includes a feedback mechanism, offering visual, audio, or haptic cues to assist in optimizing pitching form. Additionally, the METS can adjust resistance based on the tracked performance, supporting both training and rehabilitation scenarios. This invention enhances pitching technique while reducing injury risk and improving overall training effectiveness.

18 Claims, 3 Drawing Sheets

(56) References Cited

U.S. PATENT DOCUMENTS

| | | |
|---|---|---|
| 7,445,569 B2 | 11/2008 | Comello, Jr. |
| 7,517,290 B1 | 4/2009 | Springer |
| 7,699,724 B1 | 4/2010 | Derisse |
| 8,574,101 B2 | 11/2013 | Wheelbarger et al. |
| 9,135,347 B2 | 9/2015 | Damman et al. |
| 10,188,924 B1 | 1/2019 | Vickery |
| 11,969,637 B2 * | 4/2024 | Nadel ................ A63B 69/0091 473/451 |
| 12,145,040 B2 * | 11/2024 | Nadel ................ A63B 69/0002 473/451 |
| 2003/0087733 A1 | 5/2003 | Kim |
| 2006/0199673 A1 | 9/2006 | Littlejohn |
| 2010/0204020 A1 | 8/2010 | Thomas et al. |
| 2022/0008798 A1 * | 1/2022 | Fuchs ................ A63B 69/38 473/459 |
| 2023/0264087 A1 * | 8/2023 | Nadel ................ A63B 69/0091 473/424 |
| 2024/0325842 A1 * | 10/2024 | Nadel ................ A63B 69/0091 473/451 |

* cited by examiner

PITCH TRAINING DEVICE WITH INTEGRATED TRACKING AND FEEDBACK SYSTEM FOR ENHANCED PERFORMANCE AND REHABILITATION

CROSS-REFERENCE TO RELATED APPLICATIONS

This application is a continuation-in-part of U.S. patent application Ser. No. 18/443,697, titled "Spherical Cage Pitch Training Device with Spinning Ball," filed on Jul. 25, 2024. The '697 application is a divisional of U.S. Pat. No. 11,969,637 B2, titled "Spherical Cage Pitch Training Device with Spinning Ball," issued on Apr. 30, 2024. U.S. Pat. No. 11,969,637 B2 is a continuation-in-part of U.S. Pat. No. 11,439,881 B1, titled "Pitch Training Device," issued on Sep. 13, 2022. All of the aforementioned applications and patents have the same co-inventors. The disclosures of these applications and patents are hereby incorporated by reference in their entirety pursuant to 37 C.F.R. § 1.57.

BACKGROUND OF THE INVENTION

Technical Field

This invention relates generally to a pitch training apparatus with integrated tracking capabilities. This invention relates more particularly to an apparatus/device for training, improving, and rehabilitating the mechanics of pitching a baseball or softball through real-time data feedback and analysis.

This invention relates generally to apparatuses and devices for sports training, specifically for enhancing pitching performance through the use of advanced sensor-based tracking and feedback systems. This method also can be used with other ball-throwing sports and rehabilitation exercises involving arm motion and mechanics. This invention relates more particularly to a pitch training device designed to track, analyze, and improve pitching mechanics to optimize performance, ensure proper technique, and facilitate injury rehabilitation.

Field of Art Statement: This invention pertains to the field of sports training and rehabilitation apparatuses, specifically within the scope of U.S. patent classification definitions related to athletic equipment, exercise devices, and training aids. It involves the use of mechanical exercise systems, integrated sensor technology, and wireless communication for the tracking and improvement of pitching mechanics.

Background Art

The field of pitching and throwing training devices includes various types of equipment aimed at improving the strength, accuracy, and mechanics of a user's throwing motion, specifically in baseball or softball. However, the related art known to the applicant has significant limitations that affect their effectiveness in training and rehabilitation. Current devices typically lack integrated tracking and feedback systems, making it difficult for athletes to measure their progress in real-time or receive actionable feedback on their pitching mechanics. Below is a summary of the related art and the problems they present, which are solved by the applicant's invention.

Weighted Baseballs and Softballs: These devices are commonly used in training to strengthen the arm muscles and improve pitching speed. However, they do not provide real-time data on the user's pitching mechanics, such as speed, direction, or trajectory, and thus cannot offer feedback to improve technique. The absence of motion tracking and biomechanical data prevents users from identifying flaws in their motion or adjusting their form during training. Moreover, the shifting of mass within these balls can result in unnatural throwing motions, potentially leading to injury.

Resistance Band Training Devices: Some training systems use resistance bands attached to a ball or handle to simulate throwing under tension. While these devices can help build strength, they do not replicate the actual throwing motion of a pitch accurately. They also suffer from the same lack of integrated tracking, making it difficult to measure critical performance metrics such as arm speed, angle of release, or follow-through. Additionally, the resistance bands introduce unnatural tension, which may disrupt proper mechanics and limit the transferability of improvements to real-game scenarios.

Pitching Machines and Simulators: While pitching machines can simulate the throwing of a ball, they do not actively involve the user's arm motion in the process. Instead, these machines deliver pitches to a batter, focusing on improving the batter's ability rather than the pitcher's mechanics. These systems are ineffective for training the act of pitching itself and fail to provide personalized feedback or data on the user's performance.

Rehabilitation Tools: Many rehabilitation tools used by pitchers recovering from injury involve basic strengthening exercises or low-tech tools such as rubber balls or handheld weights. These tools do not provide the user with real-time insights into the mechanics of their movement, making it difficult for athletes to ensure they are properly rehabilitating without the risk of re-injury. The lack of detailed performance data limits the precision and effectiveness of rehabilitation efforts.

Problems in the Prior Art

Lack of Real-Time Feedback: Existing devices do not provide immediate feedback on the user's performance, which is crucial for improving mechanics and preventing injuries. The inability to adjust technique on the fly limits the effectiveness of training.

Absence of Data Tracking: There is no integration of advanced tracking technologies such as accelerometers, gyroscopes, or magnetometers in current training systems, which could offer valuable insights into pitch speed, direction, trajectory, spin rate, and other key metrics.

Inconsistent Resistance: In many related devices, resistance is applied unevenly or at points that do not accurately reflect the natural motion of a pitch. This can disrupt the user's mechanics and prevent effective training.

Inadequate Support for Rehabilitation: Most available tools lack the precision necessary for rehabilitation programs, which require controlled, monitored movements to ensure recovery without further injury.

The applicant's invention addresses these deficiencies by integrating a tracking and feedback system within a pitch training device. The system provides real-time data on key performance metrics, allowing users to adjust their mechanics during training. This improves training effectiveness and reduces the risk of injury by ensuring proper pitching form. Additionally, the device is designed to offer consistent and natural resistance throughout the motion, providing a more realistic and effective training experience. The invention is also well-suited for rehabilitation, allowing for precise tracking of recovery progress and safe strength-building in injured athletes.

In light of the foregoing prior art, there is a need for a pitch training device with integrated tracking and feedback capabilities to better simulate realistic pitching mechanics, provide accurate real-time feedback, and aid in the development, improvement, and rehabilitation of pitching techniques. Such a device would enable athletes to monitor key performance metrics, including speed, direction, trajectory, and spin rate, and make immediate adjustments to their form. This would result in more effective training, enhanced performance, and reduced risk of injury. Furthermore, the device would offer consistent resistance and a natural throwing motion, making it suitable for both training and rehabilitation purposes, particularly for pitchers recovering from injury who require precise control and monitoring of their progress.

BRIEF SUMMARY OF THE INVENTION

The present invention is directed to a pitch training device designed to improve pitching performance, optimize mechanics, and support rehabilitation through the integration of advanced tracking technologies. The device includes a baseball simulator, an attachment rod, and an internal tracking system capable of measuring key performance metrics such as speed, direction, pitch trajectory, and spin rate in real-time. These components are operationally connected to a mechanical exercise training system (METS) that provides adjustable resistance to simulate realistic pitching mechanics.

A key inventive concept of this device is the use of precise motion sensors (such as accelerometers, gyroscopes, and magnetometers) to monitor and report detailed data about the user's pitching performance. This data is transmitted wirelessly to an external device (such as a smartphone, tablet, or computer) where it can be analyzed and reviewed via a dedicated software application. This real-time feedback system allows athletes to make immediate adjustments, enabling more effective training sessions and faster skill acquisition.

One object of the invention is to provide real-time feedback and detailed data that helps users refine their technique and make on-the-spot corrections. This eliminates the trial-and-error method that is often inherent in traditional training systems, thus enhancing the efficiency of training.

Another object of the invention is to support rehabilitation by offering controlled resistance throughout the pitching motion and tracking progress over time. This is particularly useful for athletes recovering from injury, as the device allows for gradual increases in resistance while maintaining proper mechanics to reduce the risk of re-injury.

The attachment rod connects the baseball simulator to the METS at the center of the ball, ensuring that the applied resistance remains consistent and balanced during the motion. This solves the problem of imbalance and unnatural motion found in existing devices, leading to a more natural pitching simulation.

The invention also addresses the limitations of prior art by offering seamless integration with external devices through a wireless communication module. This feature allows users to review performance data post-session, track long-term progress, and engage in data-driven decision-making for continuous improvement.

The present invention provides an innovative and comprehensive solution for pitch training and rehabilitation by combining real-time tracking, feedback, and resistance simulation in a user-friendly and portable system. These advantages contribute to more effective training, enhanced performance, and reduced injury risks.

According to a first aspect of the invention, there is a Pitch Training Device with Integrated Tracking System comprising a baseball simulator, an attachment rod operationally connected to a mechanical exercise training system (METS), and an internal tracking device positioned within the baseball simulator. The internal tracking device is configured to track and report at least one parameter of motion, including speed and direction. Further features of the invention are disclosed in dependent claims.

According to one aspect of the present invention, there is a Pitch Training Device in the form of an internal tracking device integrated into the baseball simulator for the purpose of monitoring and reporting speed and direction during the pitching motion.

An advantage of the internal tracking device is that it provides real-time feedback and detailed data analysis, enabling users to make immediate adjustments and optimize their pitching technique.

According to one aspect of the present invention, there is a Pitch Training Device in the form of an internal tracking device comprising an accelerometer, a gyroscope, and a magnetometer for the purpose of accurately measuring and reporting the speed and direction of the baseball simulator.

An advantage of these sensors is that they offer high precision in tracking motion parameters, resulting in more accurate performance data for training and rehabilitation.

According to one aspect of the present invention, there is a Pitch Training Device in the form of a wireless communication module connected to the internal tracking device for the purpose of transmitting the tracked speed and direction data to an external device for analysis.

An advantage of the wireless communication module is that it allows for seamless data transfer to various external devices, providing users with convenient access to their performance metrics for real-time review and feedback.

According to one aspect of the present invention, there is a Pitch Training Device in the form of a power source operatively connected to the internal tracking device for the purpose of supplying power for the operation of the tracking device.

An advantage of the power source is that it ensures continuous functionality of the internal tracking device during extended training sessions, thereby providing uninterrupted tracking and data collection.

According to one aspect of the present invention, there is a Pitch Training Device in the form of a memory module within the internal tracking device for the purpose of storing data related to the speed and direction of the baseball simulator during operation.

An advantage of the memory module is that it allows users to store performance data for later playback, review, and analysis, which can be useful for tracking progress over time and making informed adjustments to training regimens.

According to one aspect of the present invention, there is a Pitch Training Device in the form of a feedback system configured to provide real-time feedback based on the tracked speed and direction data of the baseball simulator for the purpose of immediate user notification.

An advantage of the feedback system is that it offers instant cues to the user regarding their pitching performance, enabling them to make corrections and improvements on the fly, which is especially beneficial during practice sessions.

According to one aspect of the present invention, there is a Pitch Training Device in the form of a baseball simulator integrated into a spherical cage for the purpose of positioning the simulator at its center and allowing for controlled rotational motion.

An advantage of the spherical cage is that it maintains the proper alignment and balance of the baseball simulator during use, ensuring a more natural pitching motion and reducing the risk of strain or injury.

According to one aspect of the present invention, there is a Pitch Training Device in the form of an external device configured to receive and display real-time data and analytics, including speed, direction, and other tracked parameters, through a dedicated software application for the purpose of comprehensive performance analysis.

An advantage of the external device is that it provides users with an intuitive interface to view and analyze their performance metrics, enabling a deeper understanding of their pitching mechanics and facilitating targeted improvements.

According to one aspect of the present invention, there is a Pitch Training Device in the form of an attachment rod connected at the center of the baseball simulator for the purpose of maintaining the center of mass and ensuring consistent resistance during the pitching motion.

An advantage of the attachment rod is that it prevents unnatural motion and imbalance, allowing for a more realistic simulation of the pitching motion, which is essential for effective training and rehabilitation.

The present invention offers several key advantages over traditional pitch training devices, providing a comprehensive solution for improving pitching mechanics, enhancing training outcomes, and supporting rehabilitation efforts. These advantages include:

Real-Time Feedback: The integrated internal tracking system offers real-time feedback on critical performance metrics such as speed, direction, pitch trajectory, and spin rate. This allows athletes to make immediate adjustments to their pitching technique, optimizing their performance and reducing the need for trial-and-error during training sessions.

High-Precision Motion Tracking: The use of advanced sensors, including accelerometers, gyroscopes, and magnetometers, provides high-precision tracking of the pitching motion. These sensors capture subtle details of the movement, enabling more accurate and detailed analysis of the user's performance, which is crucial for refining technique and preventing injury.

Seamless Wireless Data Transfer: The wireless communication module allows for seamless transmission of performance data to external devices such as smartphones, tablets, or computers. This enables athletes and coaches to review real-time data during sessions or analyze it post-session, facilitating informed decision-making and targeted adjustments.

Data Storage for Long-Term Progress Tracking: The integrated memory module stores performance data over multiple sessions, allowing users to track their progress over time. This feature is particularly useful for long-term training plans and rehabilitation, as it provides a comprehensive record of improvements, setbacks, or areas that require further attention.

Customizable Feedback System: The invention includes a customizable feedback system that delivers instant visual, audio, or haptic cues, helping users to recognize and correct errors in their pitching mechanics immediately. This real-time guidance significantly improves the learning process and helps prevent the development of improper habits.

Natural Pitching Simulation: The centrally connected attachment rod ensures that the center of mass of the baseball simulator remains balanced during use, providing a more natural and realistic pitching motion. This consistency in resistance and motion closely replicates real-game conditions, making the device highly effective for training.

Controlled Resistance for Rehabilitation: The device can be used with a three-dimensional resistance machine that allows for variable resistance during the pitching motion.

This feature is particularly beneficial for athletes recovering from injury, as it provides controlled resistance throughout the rehabilitation process, helping them safely regain strength and improve mechanics without risking re-injury.

Versatile Integration with External Devices: The invention integrates seamlessly with a dedicated software application that enables comprehensive performance analysis. The external device interface offers a user-friendly platform for reviewing data, analyzing metrics, and tracking performance, making the device suitable for both novice and professional athletes.

Portable and User-Friendly Design: The device is compact and portable, making it easy to set up in various environments, including home gyms, professional training facilities, and rehabilitation centers. Its user-friendly design ensures that athletes can easily incorporate it into their existing training routines.

Support for Rehabilitation and Injury Prevention: The device provides precise control over resistance levels and detailed monitoring of the user's mechanics, making it ideal for rehabilitation purposes. The real-time feedback and motion tracking help prevent overuse injuries by ensuring proper mechanics are maintained throughout training or recovery.

The present invention offers an innovative and data-driven approach to pitch training, combining real-time tracking, detailed feedback, and consistent resistance simulation to enhance performance, support rehabilitation, and minimize injury risks. These advantages make the invention a valuable tool for athletes and coaches aiming to optimize their training and performance.

The invention will now be described, by way of example only, with reference to the accompanying drawings in which:

DETAILED DESCRIPTION OF THE INVENTION

The detailed embodiments of the present invention are disclosed herein. The disclosed embodiments are merely exemplary of the invention, which may be embodied in various forms. The details disclosed herein are not to be interpreted as limiting, but merely as the basis for the claims and as a basis for teaching one skilled in the art how to make and use the invention.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Throughout this specification, the word "comprise," or variations thereof such as "comprises" or "comprising," will be understood to imply the inclusion of a stated element, integer or step, or group of elements integers or steps, but not the exclusion of any other element, integer or step, or group of elements, integers or steps.

Index of Labelled Features in Figures. Features are listed in numeric order by Figure in numeric order.

Figure 1:
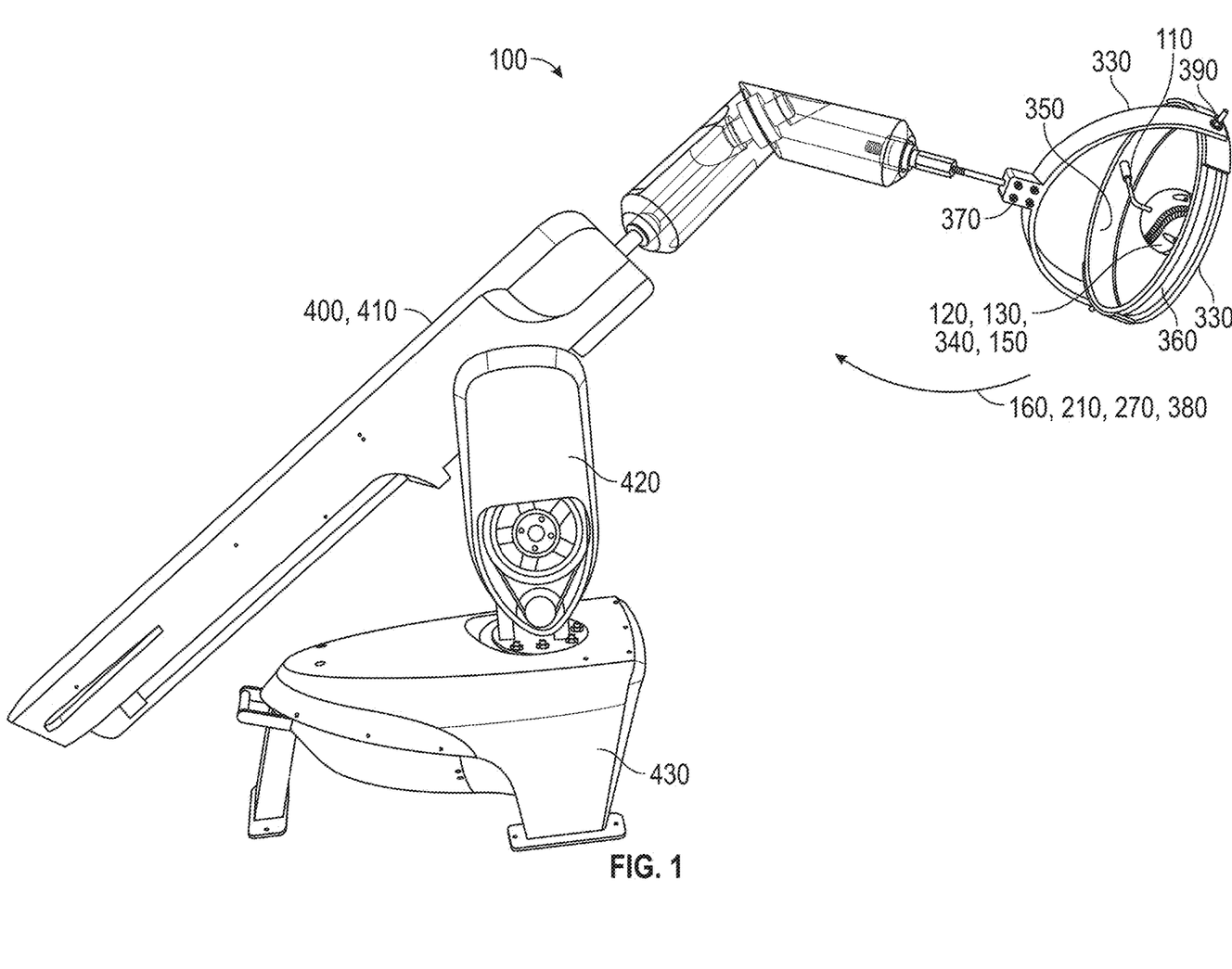
FIG. 1 is a side view of the pitch training device with integrated tracking and feedback system for enhanced performance and rehabilitation attached to a pitching machine according to the invention.
Figure 2:
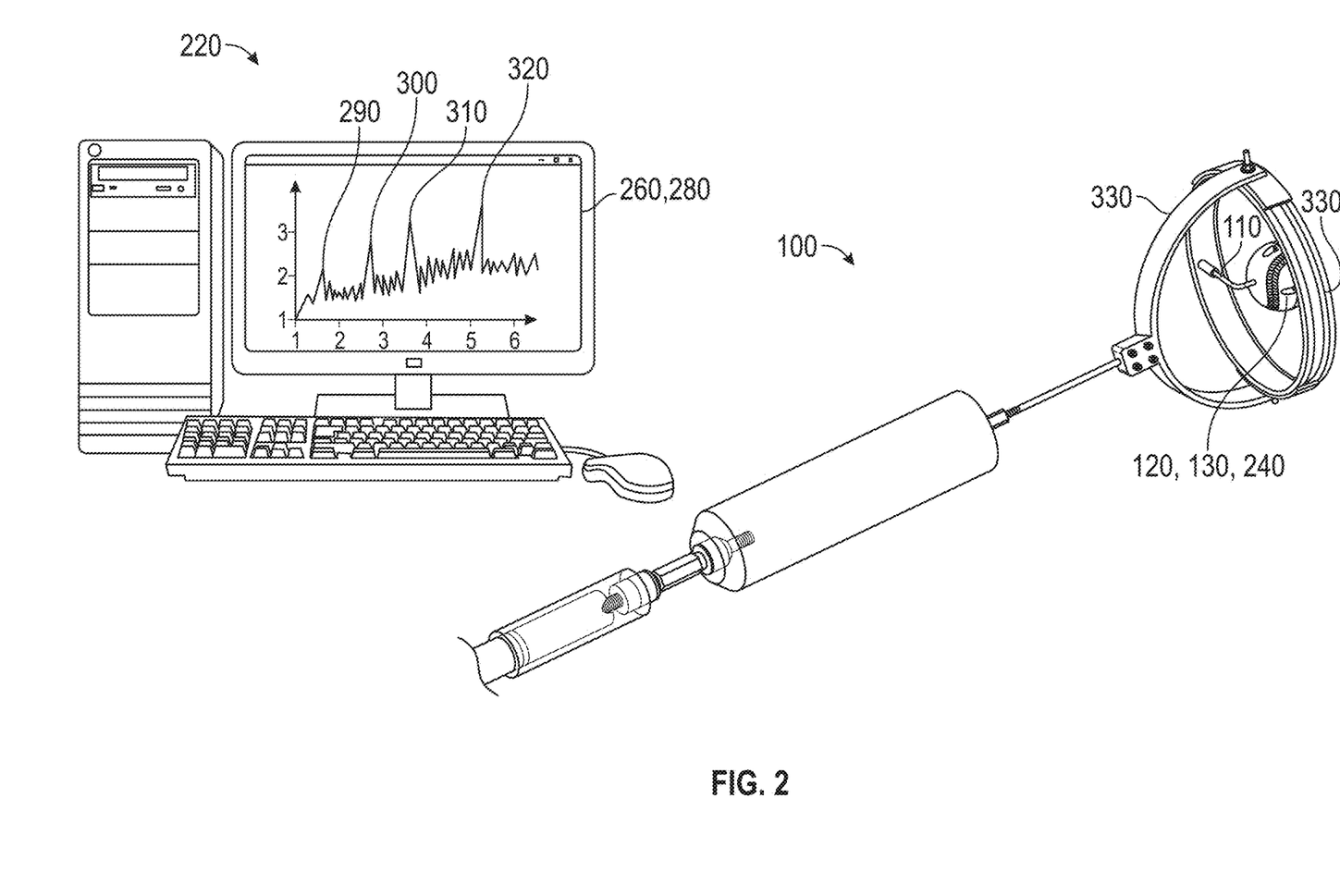
FIG. 2 is a side view of the pitch training device with integrated tracking and feedback system for enhanced performance and rehabilitation with a computer to show computer connectivity according to the invention.
Figure 3:
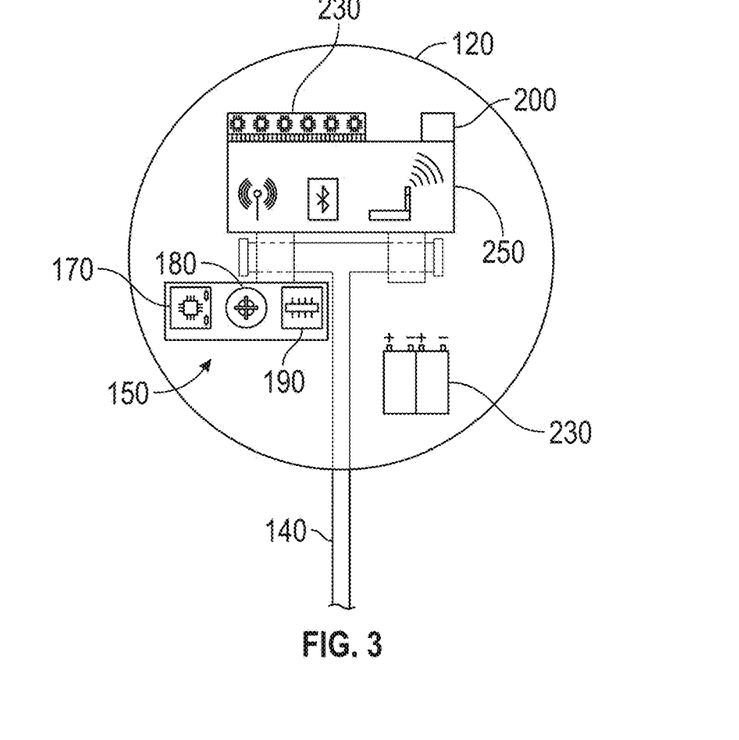
FIG. 3 is an interior view of the ball of the pitch training device with integrated tracking and feedback system for enhanced performance and rehabilitation according to the invention.
Figure 4:
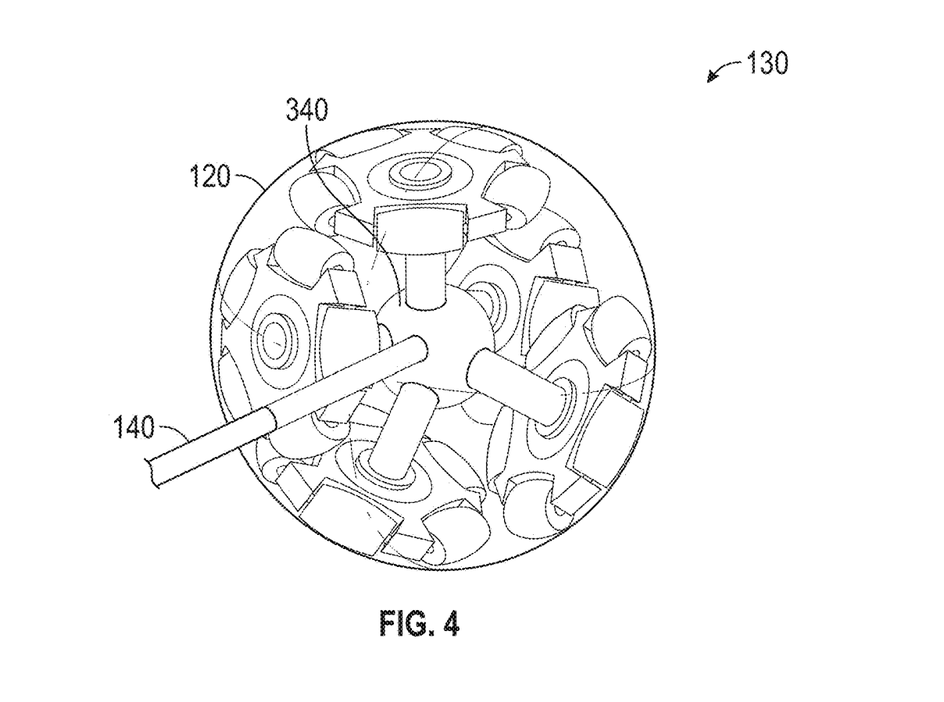
FIG. 4 is an interior view of the ball of the pitch training device with integrated tracking and feedback system for enhanced performance and rehabilitation according to the invention.

Referring to the Figures, there is shown in FIGS. 1, 2, 3, and 4 the following features:

Element 100 which is a pitch training attachment for a mechanical exercise training system (METS).
Element 110 which is a METS.
Element 120 which is a baseball.
Element 130 which is a baseball simulator.
Element 140 which is an attachment rod.
Element 150 which is an internal tracking device.
Element 160 which is a parameter of motion, including speed and direction.
Element 170 which is an accelerometer.
Element 180 which is a gyroscope.
Element 190 which is a magnetometer.
Element 200 which is a wireless communication module.
Element 210 which is a tracked speed data and a tracked direction data.
Element 220 which is a group consisting of a smartphone, a tablet, a computer, and a dedicated display device.
Element 230 which is a power source.
Element 240 which is a baseball, a football, a tennis ball, a golf ball, or another sports device.
Element 250 which is a Bluetooth, Wi-Fi, or near-field communication (NFC).
Element 260 which is a memory module.
Element 270 which is a pitching motion.
Element 280 which is a playback, a review, and an analysis of a pitching motion.
Element 290 which is a feedback system.
Element 300 which is a visual indicator, an audio indicator, and a haptic feedback device.
Element 310 which is a pitching performance.
Element 320 which is a plurality of additional parameters, including but not limited to a pitch trajectory, a spin rate, and an angular velocity.
Element 330 which is a spherical cage.
Element 340 which is a center of the spherical cage.
Element 350 which is a dedicated software application.
Element 360 which is a three-dimensional resistance machine.
Element 370 which is a sensor feedback.
Element 380 which is a pitching parameter.
Element 390 which is an optimum programmed range.
Element 400 which is a resistance.
Element 410 which is a tracked performance.
Element 420 which is an optimum programmed parameter.
Element 430 which is a controlled-motion, three-dimensional exercise machine.

The present invention is a pitch training device designed to improve pitching mechanics and provide detailed, real-time feedback to athletes during training or rehabilitation. The device integrates a baseball simulator, an attachment rod, an internal tracking system, and advanced sensors to track key performance metrics such as speed, direction, pitch trajectory, and spin rate. It connects to a mechanical exercise training system (METS), allowing for adjustable resistance throughout the pitching motion. Below is a comprehensive guide on how to make and use this invention.

HOW TO MAKE THE PRESENT INVENTION

Components and Materials

Baseball Simulator:

The core of the invention, the baseball simulator, mimics the size and shape of a standard baseball but contains internal tracking components. It is constructed from durable materials such as high-density polyurethane or a similarly robust polymer capable of withstanding continuous use and impact. The simulator is hollow to house the internal tracking components, including sensors and the power source.

Internal Tracking System:

The internal tracking system consists of several key components:

Accelerometer, Gyroscope, and Magnetometer: These sensors are embedded inside the baseball simulator to measure speed, direction, and rotation.

Microcontroller: A small, low-power microcontroller processes the data collected by the sensors.

Wireless Communication Module: This module (e.g., Bluetooth or Wi-Fi) transmits the sensor data to an external device (such as a smartphone or tablet) for real-time feedback.

Power Source: A rechargeable battery powers the sensors and wireless module. The battery should be lightweight and energy-efficient to maintain balance within the baseball simulator.

Attachment Rod:

The attachment rod connects the baseball simulator to the METS. It should be made from a lightweight but strong material, such as carbon fiber or aluminum, to ensure both durability and ease of motion. The rod connects at the center of the baseball simulator to ensure balanced resistance and prevent unnatural pitching mechanics.

Spherical Cage (Optional):

A spherical cage may be used to hold the baseball simulator in place. It consists of lightweight aluminum or plastic and allows for controlled rotation. The spherical cage is attached to the attachment rod and mounted to the METS, providing stability and balance during use.

Mechanical Exercise Training System (METS):

The METS is a commercially available resistance machine that can apply consistent or variable resistance across a wide range of motion. This system helps simulate the dynamic forces encountered during actual pitching, allowing for a realistic training experience.

Assembly

Construct the Baseball Simulator:
  Mold or construct the baseball simulator from polyurethane or similar material. It should have an internal cavity large enough to house the sensors, microcontroller, and battery.
  Embed the tracking components into the hollow center of the baseball. Ensure that the sensors are properly calibrated and secured so that they do not move during use.
  Insert the rechargeable battery, ensuring easy access for charging. A wireless charging module may also be added to streamline this process.
Attach the Rod:
  Insert one end of the rod into the center of the baseball simulator. Secure it with a threaded connection or industrial-grade adhesive to prevent wobbling or imbalance.
  Ensure that the rod is attached centrally to avoid shifting the weight distribution during use.
Connect the Spherical Cage (If Applicable):
  Install the spherical cage around the baseball simulator, making sure it is free to rotate smoothly during use. The spherical cage should be attached to the rod at several points for secure positioning.
Integration with METS:
  Attach the opposite end of the rod to the METS using a quick-release clamp or a similar connector. This allows for easy attachment and removal of the baseball simulator from the METS.
  Adjust the METS to provide the desired level of resistance based on the user's skill level or rehabilitation requirements.

HOW TO USE THE PRESENT INVENTION

Once the invention is assembled, it can be used for pitching practice, performance improvement, and rehabilitation. Below are the steps and key considerations for effective usage.

Setup and Calibration

Power on the device by pressing the power button on the baseball simulator or via a remote app if wireless control is available. Ensure that the battery is fully charged, or connect the device to a power source if using a corded configuration. Next, open the companion software application on a connected external device such as a smartphone, tablet, or computer. Follow the on-screen prompts to calibrate the sensors, which may include holding the device still and performing several practice throws to allow the sensors to adjust to the user's motion. This calibration ensures accurate tracking of speed, direction, and pitch trajectory during use. Set the METS (Mechanical Exercise Training System) to the appropriate resistance level based on the user's training goals or rehabilitation requirements. Beginners or users recovering from injury should start with lower resistance and gradually increase it as strength and endurance improve.

Pitching and Data Collection

To perform the pitching motion, stand in a natural pitching stance, holding the baseball simulator as you would a standard baseball. Execute a full pitching motion while the METS applies variable resistance throughout the movement. The internal tracking device will capture real-time data, including speed, direction, spin rate, and pitch trajectory. Users can view real-time performance metrics on a connected external device through the companion app, offering immediate insights into their performance. The app may include visual or auditory indicators, allowing for immediate adjustments in technique based on feedback. After each session, users can review detailed analytics such as average pitch speed, consistency, release angle, and rotation. The data stored in the memory module can be reviewed later for long-term progress tracking, making it ideal for both performance training and rehabilitation programs.

Rehabilitation Use

For users recovering from injury, start with low resistance settings on the METS. The tracking system will monitor progress and track muscle endurance, allowing users to increase resistance levels as their strength and range of motion improve. The feedback system will help ensure proper mechanics are followed, preventing re-injury. Over time, the resistance can be increased to help the user regain full strength and improve pitching mechanics. The precise tracking system ensures safe progression without overstraining muscles or joints.

Maintenance

Ensure that the rechargeable battery inside the baseball simulator is kept fully charged, using either a wireless charging pad or a standard charger for convenience. Regularly check the power source to ensure consistent functionality during training sessions. Additionally, keep the companion app updated to benefit from software improvements, new data analysis features, or updated calibration techniques.

The present invention provides an innovative and highly effective solution for both training and rehabilitation of pitchers. By integrating advanced tracking technology with a realistic pitching experience, athletes can receive real-time feedback, improve mechanics, and track long-term progress. Whether used by professional athletes to refine their performance or by individuals recovering from injury, the pitch training device offers unparalleled accuracy and versatility in improving pitching technique and preventing injury.

In a preferred embodiment of the invention, there is a pitch training attachment for a mechanical exercise training system (METS) for training a user to pitch a baseball, said pitch training attachment comprising: a baseball simulator, an attachment rod operatively connected to said METS and said baseball simulator; and an internal tracking device operatively positioned within said baseball simulator, configured to track and report at least one parameter of motion, including a speed and a direction.

In an alternate embodiment of the invention, there is a pitch training attachment wherein said internal tracking device is configured to track and report both said speed and said direction of said baseball simulator.

In an alternate embodiment of the invention, there is a pitch training attachment wherein said internal tracking device comprises at least one of an accelerometer, a gyroscope, and a magnetometer to determine said speed and said direction.

In an alternate embodiment of the invention, there is a pitch training attachment further comprising: a wireless communication module operatively connected to said internal tracking device, configured to transmit a tracked speed data and a tracked direction data to an external device for analysis.

In an alternate embodiment of the invention, there is a pitch training attachment wherein said external device is selected from a group consisting of a smartphone, a tablet, a computer, and a dedicated display device.

In an alternate embodiment of the invention, there is a pitch training attachment further comprising a power source operatively connected to said internal tracking device, configured to supply power for operation of said internal tracking device.

In an alternate embodiment of the invention, there is a pitch training attachment wherein said METS is configured to train said user to pitch said baseball, a football, a tennis ball, a golf ball, or another sports device.

In an alternate embodiment of the invention, there is a pitch training attachment wherein said wireless communication module utilizes at least one of Bluetooth, Wi-Fi, or near-field communication (NFC) for transmitting data.

In an alternate embodiment of the invention, there is a pitch training attachment wherein said internal tracking device further comprises a memory module configured to store data related to said speed and said direction of said baseball simulator during operation.

In an alternate embodiment of the invention, there is a pitch training attachment wherein said memory module is configured to store data for at least one of a playback, a review, and an analysis of a pitching motion.

In an alternate embodiment of the invention, there is a pitch training attachment further comprising: a feedback system configured to provide real-time feedback to said user based on a tracked speed data and a tracked direction data of said baseball simulator.

In an alternate embodiment of the invention, there is a pitch training attachment wherein said feedback system comprises at least one of a visual indicator, an audio indicator, and a haptic feedback device to inform said user of a pitching performance.

In an alternate embodiment of the invention, there is a pitch training attachment wherein said internal tracking device is configured to track and report a plurality of additional parameters, including but not limited to a pitch trajectory, a spin rate, and an angular velocity.

In an alternate embodiment of the invention, there is a pitch training attachment wherein said internal tracking device is integrated into a spherical cage configured to position said baseball simulator at a center of said spherical cage and track motion of said baseball simulator relative to said spherical cage.

In an alternate embodiment of the invention, there is a pitch training attachment wherein said external device is configured to display real-time data and analytics for said parameter of motion, including said speed and said direction, through a dedicated software application.

In an alternate embodiment of the invention, there is a pitch training attachment wherein said METS comprises a three-dimensional resistance machine.

In an alternate embodiment of the invention, there is a pitch training attachment wherein said user receives a sensor feedback if a pitching parameter is outside of an optimum programmed range.

In an alternate embodiment of the invention, there is a pitch training attachment wherein said METS adjusts a resistance in response to a tracked performance, increasing or decreasing said resistance based on whether a pitching motion is within or outside an optimum programmed parameter.

In an alternate embodiment of the invention, there is a pitch training attachment wherein said METS comprises a controlled-motion, three-dimensional exercise machine.

The present invention provides numerous advantages over existing pitch training devices, addressing critical gaps in training efficacy, performance analysis, and rehabilitation. By integrating advanced tracking capabilities, this invention offers a comprehensive solution for athletes seeking to refine their pitching technique, enhance their performance, and expedite recovery from injuries.

One of the primary advantages is the inclusion of an internal tracking device that provides real-time feedback and precise data analysis. This feature enables users to monitor key performance metrics such as speed, direction, pitch trajectory, and spin rate during every pitch. The availability of this data in real-time allows athletes to make immediate corrections and adjustments to their technique, significantly reducing the time required to improve performance. This capability is particularly beneficial for coaches and trainers, as they can offer targeted feedback during training sessions, optimizing the learning process and enhancing skill acquisition.

The invention utilizes high-precision sensors, including accelerometers, gyroscopes, and magnetometers, which provide a detailed and accurate depiction of the pitching motion. This enables the system to capture subtle nuances in the pitcher's technique, such as inconsistencies in arm speed or deviations in pitch angle, that are often missed by traditional training methods. This high-precision tracking facilitates a deeper understanding of pitching mechanics and allows for more precise adjustments to the user's technique, resulting in improved performance and reduced risk of injury.

The incorporation of a wireless communication module further enhances the functionality of the pitch training device by enabling seamless data transfer to external devices such as smartphones, tablets, or computers. This feature allows users to conveniently access their performance data for real-time review, post-session analysis, or long-term progress tracking. The wireless connectivity also supports integration with a dedicated software application, which can provide visualizations, analytics, and personalized feedback. This capability empowers athletes to take a more active role in their training, making data-driven decisions to optimize their performance and development.

The device is equipped with a memory module that stores detailed performance data, including speed, direction, and trajectory of each pitch. This feature enables users to review their historical data and track their progress over time, providing a valuable resource for both athletes and coaches. By maintaining a comprehensive record of performance metrics, the memory module supports long-term training and rehabilitation programs, helping users identify patterns, assess the effectiveness of their training routines, and make informed adjustments to their practice regimens.

The feedback system integrated into the device provides real-time cues through visual, audio, or haptic signals, alerting the user to any deviations from optimal pitching mechanics. This instant feedback mechanism allows for immediate correction, preventing the reinforcement of incorrect techniques and promoting the development of proper form. The ability to receive instantaneous feedback is critical for minimizing the risk of injury, as it helps users avoid repetitive strain and improper mechanics that can lead to overuse injuries.

The pitch training device also includes a spherical cage that maintains the proper alignment and balance of the baseball simulator during use. This feature ensures that the resistance and motion of the ball remain consistent and smooth, closely replicating the natural pitching motion. The spherical cage prevents the ball from wobbling or shifting off-center, which can disrupt the user's balance and pitching form. This design is particularly advantageous for athletes recovering from injuries, as it reduces the strain on the joints and muscles, allowing them to safely rebuild strength and coordination.

The dedicated software application provides an intuitive platform for users to visualize their performance data and analyze their pitching mechanics in detail. The application can offer customized training programs, performance analytics, and personalized feedback based on the data collected by the internal tracking device. This comprehensive tool supports a more informed and strategic approach to training, enabling athletes to set specific goals, monitor their progress, and achieve measurable improvements in their performance.

A key design feature of the invention is the centrally connected attachment rod, which ensures that the center of mass of the baseball simulator remains stable and balanced during the pitching motion. This design mimics the natural feel of a free-throwing ball, providing a more realistic and effective simulation of actual pitching. The consistent resistance applied through the attachment rod helps users develop proper pitching mechanics, improving their ability to generate power, accuracy, and consistency in their pitches.

The device's ability to simulate realistic pitching mechanics while providing dynamic resistance throughout the motion makes it a versatile tool for athletes of all skill levels, from beginners to professionals. The three-dimensional resistance system allows users to customize the level of difficulty and focus on specific aspects of their pitching technique, such as arm speed, release angle, or follow-through. This adaptability makes the device suitable for various stages of training and rehabilitation, supporting a gradual and safe progression in skill development and recovery.

Additionally, the pitch training device is designed to be compact, portable, and user-friendly, making it accessible for use in various environments, including home gyms, professional training facilities, and rehabilitation centers. Its ease of integration with existing training systems and its compatibility with a wide range of external devices further enhance its versatility and practicality.

The present invention offers a comprehensive and innovative approach to pitch training and rehabilitation, combining advanced tracking and feedback capabilities with realistic motion simulation and dynamic resistance. These features provide a powerful tool for improving pitching performance, enhancing training efficiency, and supporting safe and effective rehabilitation. The invention addresses the limitations of existing devices and sets a new standard for data-driven, performance-enhancing training solutions for athletes at all levels.

The present invention offers a range of significant advantages that elevate the quality of pitch training, performance analysis, and rehabilitation. By incorporating advanced sensor technologies, real-time data feedback, and a versatile integration with existing training systems, the device solves many limitations found in prior art. Below is an enhanced summary of the key advantages, with additional details:

Real-Time Feedback for Immediate Improvement: One of the most powerful features of the invention is its ability to provide instant feedback on key pitching metrics such as speed, direction, spin rate, and pitch trajectory. Athletes receive immediate data on each pitch, allowing them to make on-the-spot corrections to their technique. This capability transforms traditional training methods by eliminating the delays in identifying and correcting errors, accelerating the improvement process and ensuring that users can continuously fine-tune their form during each session. The instant feedback loop enhances the efficiency and effectiveness of training, offering a data-driven approach that keeps athletes on the right track from the very first pitch.

High-Precision Motion Tracking for Detailed Analysis: The integrated sensors (accelerometer, gyroscope, and magnetometer) offer extremely precise measurements of the pitcher's motion, capturing even the smallest nuances in technique. These sensors provide highly accurate data on arm speed, release angle, rotation, and ball trajectory, which are essential for pitchers seeking to improve accuracy and control. The granular detail captured by these sensors far exceeds that of traditional methods, giving athletes and coaches an unprecedented level of insight into mechanics. This precision enables users to pinpoint inefficiencies in their delivery and make specific, informed adjustments to improve performance.

Seamless Wireless Data Transfer for Enhanced Flexibility: The invention's wireless communication module allows users to transmit performance data to external devices (smartphones, tablets, or computers) without the need for physical connections or data downloads. This seamless integration enables athletes and coaches to review real-time data during training sessions or post-session, whether on the field or in a gym. The wireless functionality also supports remote coaching scenarios, where a coach can monitor and provide feedback from a different location. The flexibility of data access allows users to track their progress on the go, without being tied to specific hardware or locations.

Comprehensive Data Storage for Long-Term Progress Tracking: The built-in memory module allows users to store data over multiple training sessions. This feature is invaluable for those looking to track long-term performance trends, as it provides a complete history of metrics such as speed, direction, and spin rate. Over time, this data helps users and coaches identify patterns of improvement or areas that need further attention. The stored data also facilitates periodic review, making it easier to quantify progress and adjust training plans accordingly. For professional athletes, this long-term tracking is essential for ensuring continuous development and meeting performance goals.

Customizable Feedback System for Tailored Training: The device features a customizable feedback system, allowing users to choose between visual (LED indicators), audio (beeps), or haptic (vibration) cues to receive feedback. This adaptable system ensures that feedback is delivered in the most effective format for each user's preference or training environment. For example, in a noisy gym, haptic feedback might be preferable, while visual cues could be more useful during quiet solo sessions. Tailoring the feedback mechanism to individual needs enhances the overall training experience, helping users stay engaged and focused while improving their pitching form.

Natural Pitching Simulation with Balanced Resistance: The device's attachment rod is connected to the baseball simulator at its center, ensuring that the center of mass remains balanced during use. This allows for a pitching motion that closely replicates the natural feeling of throwing a real baseball, unlike prior art devices where weight shifts or off-center connections disrupt the user's form. Maintaining a consistent and natural resistance throughout the motion ensures that users can practice with realistic simulation, which is essential for transferring skills from training to game situations. By delivering a true-to-life pitching experience, the device enhances both accuracy and muscle memory development.

Controlled Variable Resistance for Safe and Effective Rehabilitation: The device can be connected to a three-dimensional resistance machine that provides adjustable resistance throughout the pitching motion. This feature is particularly beneficial for rehabilitation, where athletes recovering from injury need to carefully manage the resistance levels to rebuild strength without risking further damage. The ability to gradually increase resistance ensures a safe progression of muscle development and technique refinement, making the device highly suitable for those in various stages of recovery. The combination of real-time feedback and controlled resistance enables users to monitor their mechanics closely, ensuring they maintain proper form as they regain their strength and confidence.

Versatile Integration with External Devices and Software: The invention integrates with a dedicated software application that allows users to review performance metrics in real time or analyze data in detail after a session. The user-friendly interface enables athletes and coaches to visualize key data points, such as speed, trajectory, and spin rate, and use this information to develop customized training plans. The software also facilitates data export, enabling easy sharing with coaches, sports scientists, or physical therapists for more comprehensive analysis. This versatile integration supports collaborative coaching environments and ensures that all stakeholders have access to the same detailed performance data, leading to more effective training outcomes.

Portable, Compact, and Easy to Use: The device is designed to be portable and user-friendly, making it suitable for use in a wide range of environments, from home gyms to professional training facilities. The compact design ensures that athletes can easily incorporate it into their daily routines without the need for extensive setup or specialized equipment. This portability is particularly valuable for traveling athletes who need to maintain their training regimen on the road. Additionally, the device's simple operation ensures that even users with minimal technical experience can quickly start using the system and benefiting from its advanced features.

Comprehensive Support for Injury Prevention and Rehabilitation: The device's precise monitoring and feedback capabilities make it an ideal tool for injury prevention. By providing real-time feedback on body mechanics, the system helps athletes avoid overuse injuries and improper mechanics that can lead to long-term issues. The system also supports rehabilitation by tracking an athlete's recovery progress and ensuring they are building strength and refining mechanics at a safe pace. The combination of real-time data and controlled resistance enables users to recover safely while building the proper form, reducing the risk of re-injury and enhancing overall recovery outcomes.

The present invention offers an innovative, data-driven solution for pitchers and coaches looking to improve performance, refine mechanics, and recover from injury. By combining advanced tracking technologies, real-time feedback, natural motion simulation, and versatile integration with external devices, this pitch training device sets a new standard for efficacy, convenience, and accuracy in athletic training and rehabilitation. These advantages make the device indispensable for athletes at all levels—from beginners to professionals—seeking to maximize their potential and minimize the risks of injury.

The invention has been described by way of examples only. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claims.

Although the invention has been explained in relation to various embodiments, it is to be understood that many other possible modifications and variations can be made without departing from the spirit and scope of the invention.

The invention claimed is:

1. A pitch training attachment for a mechanical exercise training system (METS) for training a user to pitch a baseball, said pitch training attachment comprising:
   a baseball simulator;
   an attachment rod operatively connected to said METS and said baseball simulator; and
   an internal tracking device operatively positioned within said baseball simulator, configured to track and report at least one parameter of motion, including a speed and a direction;
   wherein said internal tracking device is integrated into a spherical cage configured to position said baseball simulator at a center of said spherical cage and track motion of said baseball simulator relative to said spherical cage.

2. The pitch training attachment of claim 1, wherein said internal tracking device is configured to track and report both said speed and said direction of said baseball simulator.

3. The pitch training attachment of claim 1, wherein said internal tracking device comprises at least one of an accelerometer, a gyroscope, and a magnetometer to determine said speed and said direction.

4. The pitch training attachment of claim 1, further comprising:
   a wireless communication module operatively connected to said internal tracking device, configured to transmit a tracked speed data and a tracked direction data to an external device for analysis.

5. The pitch training attachment of claim 4, wherein said external device is selected from a group consisting of a smartphone, a tablet, a computer, and a dedicated display device.

6. The pitch training attachment of claim 1, further comprising a power source operatively connected to said internal tracking device, configured to supply power for operation of said internal tracking device.

7. The pitch training attachment of claim 1, wherein said METS is configured to train said user to pitch said baseball, a football, a tennis ball, a golf ball, or another sports device.

8. The pitch training attachment of claim 4, wherein said wireless communication module utilizes at least one of Bluetooth, Wi-Fi, or near-field communication (NFC) for transmitting data.

9. The pitch training attachment of claim 1, wherein said internal tracking device further comprises a memory module configured to store data related to said speed and said direction of said baseball simulator during operation.

10. The pitch training attachment of claim 9, wherein said memory module is configured to store data for at least one of a playback, a review, and an analysis of a pitching motion.

11. The pitch training attachment of claim 1, further comprising:
  a feedback system configured to provide real-time feedback to said user based on a tracked speed data and a tracked direction data of said baseball simulator.

12. The pitch training attachment of claim 11, wherein said feedback system comprises at least one of a visual indicator, an audio indicator, and a haptic feedback device to inform said user of a pitching performance.

13. The pitch training attachment of claim 1, wherein said internal tracking device is configured to track and report a plurality of additional parameters, including but not limited to a pitch trajectory, a spin rate, and an angular velocity.

14. The pitch training attachment of claim 4, wherein said external device is configured to display real-time data and analytics for said parameter of motion, including said speed and said direction, through a dedicated software application.

15. The pitch training attachment of claim 1, wherein said METS comprises a three-dimensional resistance machine.

16. The pitch training attachment of claim 1, wherein said user receives a sensor feedback when a pitching parameter is outside of an optimum programmed range.

17. The pitch training attachment of claim 1, wherein said METS adjusts a resistance in response to a tracked performance, increasing or decreasing said resistance based on whether a pitching motion is within or outside an optimum programmed parameter.

18. The pitch training attachment of claim 1, wherein said METS comprises a controlled-motion, three-dimensional exercise machine.

* * * * *